(12) United States Patent
Nishiyama

(10) Patent No.: US 6,718,230 B2
(45) Date of Patent: Apr. 6, 2004

(54) TRANSACTION MANAGEMENT METHOD AND APPARATUS, AND PROGRAM AND RECORDING MEDIUM THEREOF

(75) Inventor: Soichi Nishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/059,289

(22) Filed: Jan. 31, 2002

(65) Prior Publication Data

US 2003/0083946 A1 May 1, 2003

(30) Foreign Application Priority Data

Oct. 26, 2001 (JP) ......................................... 2001-328734

(51) Int. Cl.[7] ........................... G06F 17/00; G06F 17/60
(52) U.S. Cl. ....................... 700/231; 700/237; 700/244; 705/26
(58) Field of Search ............................. 700/231, 232, 700/237, 244, 236; 705/26, 27

(56) References Cited

U.S. PATENT DOCUMENTS

| | | | | |
|---|---|---|---|---|
| 5,671,279 A | * | 9/1997 | Elgamal | 705/79 |
| 5,790,677 A | * | 8/1998 | Fox et al. | 705/78 |
| 5,826,241 A | * | 10/1998 | Stein et al. | 705/26 |
| 5,848,161 A | * | 12/1998 | Luneau et al. | 705/78 |
| 6,453,296 B1 | * | 9/2002 | Iwamura | 705/26 |
| 6,505,171 B1 | * | 1/2003 | Cohen et al. | 705/26 |
| 6,519,573 B1 | * | 2/2003 | Shade et al. | 705/26 |

* cited by examiner

Primary Examiner—Gene O. Crawford
(74) Attorney, Agent, or Firm—Staas & Halsey LLP

(57) ABSTRACT

Transaction management method in an intermediate server intermediates a transaction between a seller terminal and a purchaser terminal. The method includes storing a transaction procedure having a plurality of procedures in a predetermined order for each transaction type, and the attribute information regarding the data to be transmitted or received in each of the plurality of procedures, and transmitting or receiving the data to be transmitted or received between the seller terminal and the purchaser terminal in accordance with the transaction procedure determined by a transaction type and its attribute information in the transaction between the seller terminal and the purchaser terminal.

8 Claims, 13 Drawing Sheets

FIG. 2A — 14

| TRANSACTION ID | DEALER #1 | DEALER #2 | TRANSACTION TYPE | TRANSACTION CONDITION | RECEPTION FORMAT |
|---|---|---|---|---|---|
| T001 | A12345 | B12345 | X01 | PROCEDURE #1 | X01-001-P1 |
| T002 | A67890 | B67890 | X02 | PROCEDURE #2 | X02-002-P1 |
| ... | | | | | |

FIG. 2B — 15

| TRANSACTION TYPE | TRANSACTION MARK | PROCEDURE #1 | PROCEDURE #1 FORMAT | PROCEDURE #2 | PROCEDURE #2 FORMAT |
|---|---|---|---|---|---|
| X01 | X01.jpg | X01-001 | X01-001-P1, X01-001-P2 | X01-002 | X01-002-P1 |
| X02 | X02.jpg | X02-001 | X02-001-P1 | X01-002 | X02-002-P1 |
| ... | | | | | |

FIG. 2C — 16

| TRANSACTION TYPE | FORMAT | CHECK ITEM |
|---|---|---|
| X01 | X01-002-P2 | X01-001-P2-01 = X01-001-P1-03 |
| ... | X01-...... | ...... |
| X02 | X02-...... | ...... |

FIG. 2D — 17

| ORIGINATOR | TRANSMITTING DESTINATION | TRANSACTION ID | FORMAT (INPUT DATA) |
|---|---|---|---|

FIG. 3

TRANSACTION MANAGEMENT FOR GENERAL CONSUMER GOODS: X01

|  | SELLER TERMINAL PROCEDURE | PURCHASER TERMINAL PROCEDURE | PAYMENT AUTHORIZED AGENCY TERMINAL PROCEDURE |
|---|---|---|---|
| BEFORE SELLING OR BUYING : X01-01 | PROVIDE INFORMATION ABOUT SALE COMMODITY : X01-01-001 | | |
| | | OFFER TO PURCHASE : X01-01-002 | |
| | PROVIDE THE PURCHASE CONTENT AND CONFIRMATION INFORMATION FOR PAYMENT | | |
| | | PAYMENT APPROVAL | |
| BEFORE ARRIVAL OF COMMODITY : X01-02 | PROVIDE SELLING OR BUYING PROCESS CONDITION | | |
| | | CONFIRM THE PROCESS CONDITION | |
| ARRIVAL OF COMMODITY | DELIVER THE COMMODITY | | |
| | | ACCEPT THE COMMODITY | |
| COOLING OFF (IF CLAIMED) | | REQUEST FOR COOLING OFF WITHIN THE LAPSE OF DAYS FROM ARRIVAL OF COMMODITY (DAYS MAY VARY DEPENDING ON THE KIND OF COMMODITY) | |
| | ACCEPT A REQUEST FOR COOLING OFF | | |
| | | RETURN THE COMMODITY | |
| PAYMENT PROCESS | DEMAND FOR PAYMENT | | |
| | | | DEMAND PROCESS |
| | | CONFIRM THE DEMAND | |

FIG. 4

TRANSACTION MANAGEMENT FOR CONSUMER DURABLE GOODS: X02

|  | SELLER TERMINAL PROCEDURE | PURCHASER TERMINAL PROCEDURE | PAYMENT AUTHORIZED AGENCY TERMINAL PROCEDURE |
|---|---|---|---|
| BEFORE SELLING OR BUYING : X02-01 | PROVIDE INFORMATION ABOUT SALE COMMODITY : X02-01-001 | | |
| | | OFFER TO PURCHASE : X02-01-002 | |
| | PROVIDE THE PURCHASE CONTENT AND CONFIRMATION INFORMATION FOR PAYMENT | | |
| | | PAYMENT APPROVAL | |
| BEFORE ARRIVAL OF COMMODITY : X02-02 | PROVIDE SELLING OR BUYING PROCESS CONDITION | | |
| | | CONFIRM THE PROCESS CONDITION | |
| ARRIVAL OF COMMODITY | DELIVER THE COMMODITY (CONFIRMATION FOR COMMODITY DISPATCH CONDITION) | | |
| | | ACCEPT THE COMMODITY | |
| COOLING OFF (IF CLAIMED) | | REQUEST FOR COOLING OFF WITHIN THE LAPSE OF DAYS FROM ARRIVAL OF COMMODITY (DAYS MAY VARY DEPENDING ON THE KIND OF COMMODITY) | |
| | ACCEPT A REQUEST FOR COOLING OFF | | |
| | | RETURN THE COMMODITY | |
| PAYMENT PROCESS | DEMAND FOR PAYMENT | | |
| | | | DEMAND PROCESS |
| | | CONFIRM THE DEMAND | |

FIG. 5

TRANSACTION MANAGEMENT FOR CONSUMER DURABLE GOODS: X02

|  | SELLER TERMINAL PROCEDURE | PURCHASER TERMINAL PROCEDURE | PAYMENT AUTHORIZED AGENCY TERMINAL PROCEDURE |
|---|---|---|---|
| MAINTE-NANCE | SEND THE MAINTE-NANCE INFORMATION | | |
| | | CONFIRM THE MAINTE-NANCE INFORMATION | |
| | | REQUEST FOR MAINTENANCE | |
| | | DELIVER THE COMMODITY | |
| | (CONFIRMATION FOR COMMODITY DISPATCH CONDITION) | | |
| | ACCEPT THE COMMODITY | | |
| | MAINTENANCE PROCESS | | |
| | DELIVER THE COMMODITY AFTER MAINTENANCE | | |
| | (CONFIRMATION FOR COMMODITY DISPATCH CONDITION) | | |
| | | ACCEPT THE COMMODITY | |

FIG. 6

REMOVAL PROCEDURE: X03

| | FIRST SELLER (A AUTONOMY) TERMINAL PROCEDURE | PURCHASER (REMOVAL PERSON) TERMINAL PROCEDURE | SECOND SELLER (B AUTONOMY) TERMINAL PROCEDURE |
|---|---|---|---|
| BEFORE REMOVAL | PROVIDE THE INFORMATION BEFORE REMOVAL | | |
| | | REQUEST BEFORE REMOVAL | |
| | PROVIDE THE CONFIRMATION INFORMATION FOR THE CONTENT BEFORE REMOVAL | | |
| | | APPROVE THE REQUEST FOR REMOVAL (MOVING-OUT NOTIFICATION) | |
| AUTONOMY REMOVAL PROCESS | TRANSMIT THE REMOVAL CONTENT | | |
| | | | CONFIRM THE ACCEPTANCE OF THE REMOVAL CONTENT |
| | | CONFIRM THE CONDITION OF REMOVAL PROCESS | |
| AFTER REMOVAL | | | PROVIDE THE INFORMATION AFTER REMOVAL |
| | | REQUEST AFTER REMOVAL | PROVIDE THE CONFIRMATION INFORMATION FOR THE CONTENT AFTER REMOVAL |
| | | APPROVE THE REQUEST AFTER REMOVAL (MOVING-IN NOTIFICATION) | |

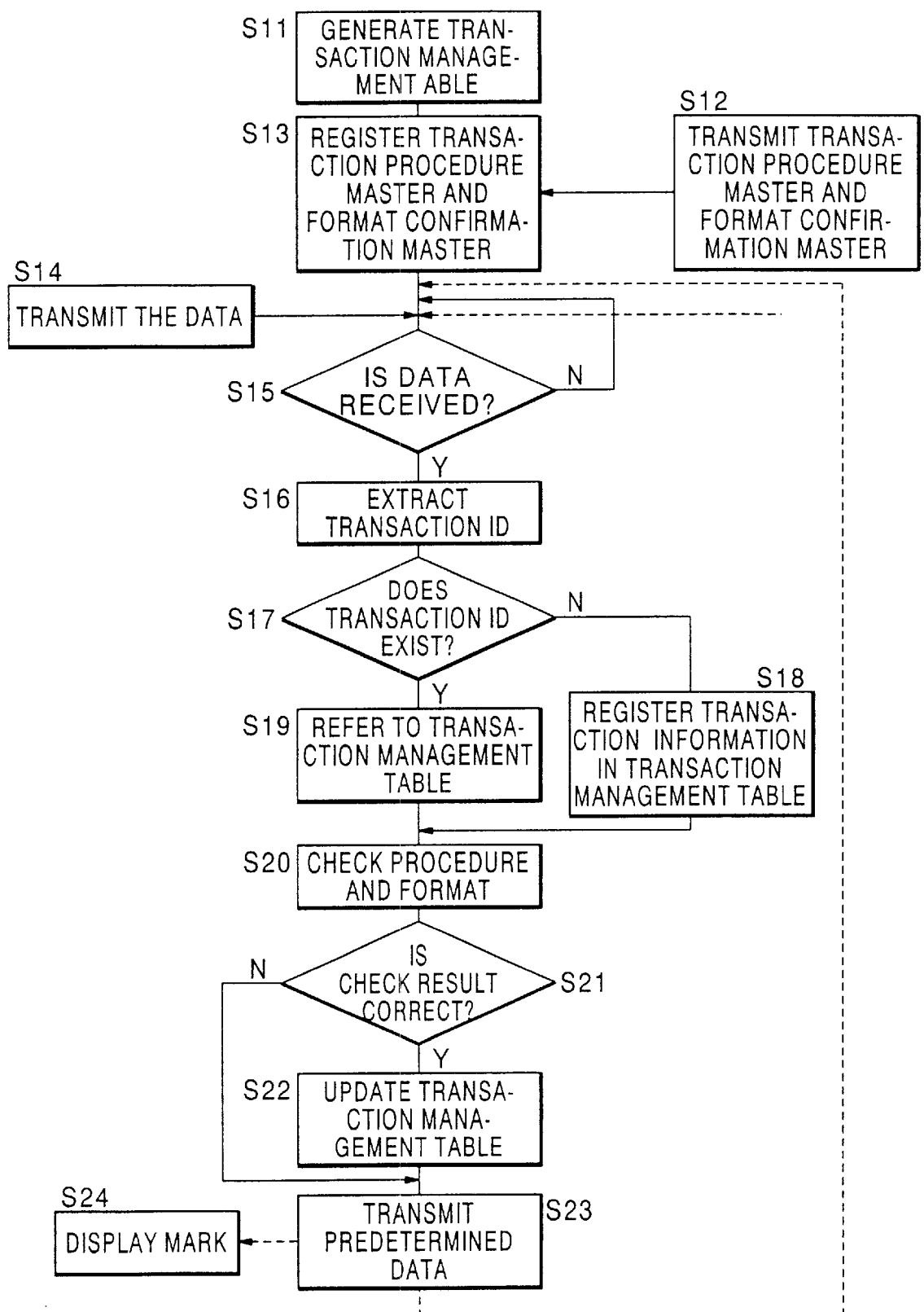

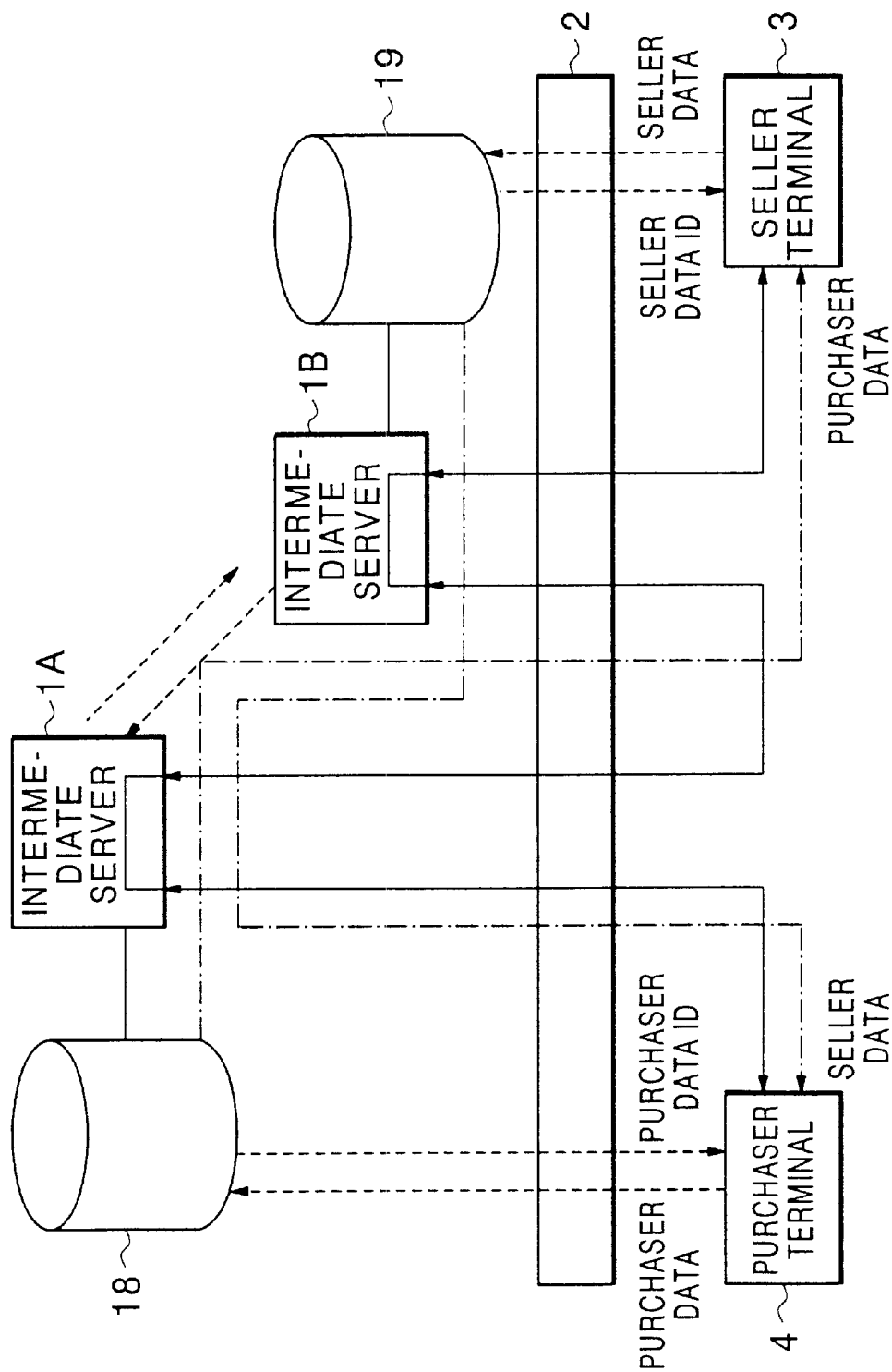

TRANSACTION MANAGEMENT METHOD AND APPARATUS, AND PROGRAM AND RECORDING MEDIUM THEREOF

BACKGROUND OF THE INVENTION

1. Field of the Invention

The present invention relates to a transaction management method and apparatus and a program and a recording medium thereof, and more particularly to a transaction management method and apparatus and a program and a recording medium in which the consistency of a transaction procedure in a network service transaction or the consistency of transmitted or received information can be assured.

2. Description of the Related Art

Along with the development of the Internet, there are increasing dealings or transactions of commodities or services employing the Internet. In the transaction employing the networks including the Internet (hereinafter referred to as a network service transaction), the seller side conventionally takes the initiative in the transaction procedure, as shown in FIG. 13.

For example, if the seller (server 100) makes public a commodity via a network 300 (process c1), the purchaser (client 200) expresses a will for buying the commodity (process c2). A service covenant is publicized from the seller (process c3), and the purchaser agrees with this service covenant (process c4). Thus, the purchasing contents are made public from the seller (process c5), and the purchaser inputs the purchasing contents (process c6). In response, the seller confirms the purchasing contents (process c7). If the purchaser agrees with this confirmation (process c8), the seller makes public the purchasing acceptance (process c9). In this way, the purchaser must pursue the purchasing procedure in accordance with a transaction procedure defined by the seller side. The purchaser is obliged to input the data to buy the commodity.

The transaction procedure as shown in FIG. 13 is only one example, and in the network service transaction, the transaction procedure depends on each seller, and is not integrated at all. This is also the same with the data to be input in the service covenant or transaction. Therefore, it was difficult for the user (purchaser) side to know that the dealing or contract will progress in accordance with what procedure. Also, it was difficult to know whether or not the procedure is reliable. In other words, if the purchaser wants to make the transaction, there is no other way than relying on the seller (a server program of the seller), and the purchaser felt uneasy.

On one hand, the purchaser may alter the commodity contents in inputting the purchasing contents (process c6) or agreeing with the purchasing contents (process c8) in the transaction procedure as shown in FIG. 13. For instance, it is possible to modify artificially the unit price that was 1000 yen in making public the purchasing contents (process c5) or confirming the purchasing contents (process c7) to 100 yen when inputting the purchasing contents or agreeing with the purchasing contents. In this case, if the seller side has no check function, the transaction is made directly with the data of "100 yen". Accordingly, the seller had no other way than relying on the purchaser, and thus felt uneasy.

Apart from the above, the transaction may be interrupted due to a malfunction or failure in the server for the seller, the terminal of the purchaser, or the network on the course of the procedure for transaction in some cases. In this case, even if the transaction was resumed, the transaction could not be continued from the interrupted portion, whereby it was required to abandon the transaction procedure pursued halfway and restart the procedure from the beginning.

SUMMARY OF THE INVENTION

It is an object of the present invention to provide a transaction management method that can assure the consistency of a transaction procedure or the consistency of transmitted or received information.

It is another object of the invention to provide a transaction management apparatus that can assure the consistency of a transaction procedure or the consistency of transmitted or received information.

It is another object of the invention to provide a program for implementing a transaction management method that can assure the consistency of a transaction procedure or the consistency of transmitted or received information.

It is a further object of the invention to provide a program recording medium recording a program for implementing a transaction management method that can assure the consistency of a transaction procedure or the consistency of transmitted or received information.

A transaction management method an intermediate server of the invention to intermediate a transaction between a seller terminal and a purchaser terminal which are interconnected via a network. The method comprises storing a transaction procedure comprising a plurality of procedures in a predetermined order for each transaction type, and the attribute information regarding the data to be transmitted or received in each of the plurality of procedures, and transmitting or receiving the data to be transmitted or received between the seller terminal and the purchaser terminal in accordance with the transaction procedure determined by the transaction type and its attribute information in the transaction between the seller terminal and the purchaser terminal.

A transaction management apparatus of the invention to intermediate a transaction between a seller terminal and a purchaser terminal which are interconnected via a network. The apparatus comprises storage means for storing a transaction procedure comprising a plurality of procedures in a predetermined order for each transaction type and the attribute information regarding the data to be transmitted or received in each of the plurality of procedures, and procedure management means for transmitting or receiving the data to be transmitted or received between the seller terminal and the purchaser terminal in accordance with the transaction procedure determined by the transaction type and its attribute information in the transaction between the seller terminal and the purchaser terminal.

A program of the invention realizes the transaction management apparatus to intermediate a transaction between the seller terminal and the purchaser terminal which are interconnected via the network. The program causes a computer, which is the transaction management apparatus, to execute storing a transaction procedure comprising a plurality of procedures in a predetermined order for each transaction type, and the attribute information regarding the data to be transmitted or received in each of the plurality of procedures, and transmitting or receiving the data to be transmitted or received between the seller terminal and the purchaser terminal in accordance with the transaction procedure determined by the transaction type and its attribute information in the transaction between the seller terminal and the purchaser terminal, and is executed on a computer which is the transaction management apparatus.

With the transaction management method, apparatus and program according to this invention, the data is transmitted or received between the seller terminal and the purchaser terminal in accordance with the transaction procedure determined by the transaction type and its attribute information. Accordingly, the transaction procedure, the service covenant, and the input data in the network service transaction can be substantially unified. Therefore, the user (purchaser) can roughly predict the progress of transaction procedure to trust the procedure, and can rely on the intermediate server. Also, the seller can rely on the data which is transmitted or received via the intermediate server, even though there is not specifically a check function.

A program recording medium of the invention is a computer readable program recording medium recording the program that realizes the transaction management apparatus to intermediate a transaction between the seller terminal and the purchaser terminal which are interconnected via the network.

With the program recording medium of the invention, the program of the invention can be stored and provided in a suitable computer readable recording medium, such as a floppy disk, CD-ROM and CDR/W. Thereby, the transaction management apparatus that makes the transaction management method can be easily realized.

BRIEF DESCRIPTION OF THE DRAWINGS

FIG. 2 is an explanatory table for explaining an intermediate server, especially FIG. 2A shows one example of a transaction management table, FIG. 2B shows one example of a transaction procedure master, FIG. 2C shows one example of a format confirmation master, FIG. 2D shows one example of transmission or reception data.

FIG. 3 shows a transaction procedure for selling or buying the general consumer goods in a network service transaction in accordance with a transaction management method of the invention.

FIGS. 4 and 5 show a transaction procedure for selling or buying the consumer durable goods in a network service transaction in accordance with the transaction management method of the invention.

FIG. 6 shows a transaction procedure for making a removal notice in a network service transaction in accordance with the transaction management method of the invention.

FIG. 7 is a transaction management processing flowchart showing a transaction management process in an intermediate server of the invention.

FIG. 12 shows another example of managing the transaction procedure via the intermediate server of the invention.

DETAILED DESCRIPTION OF THE PREFERRED EMBODIMENTS

Figure 1:
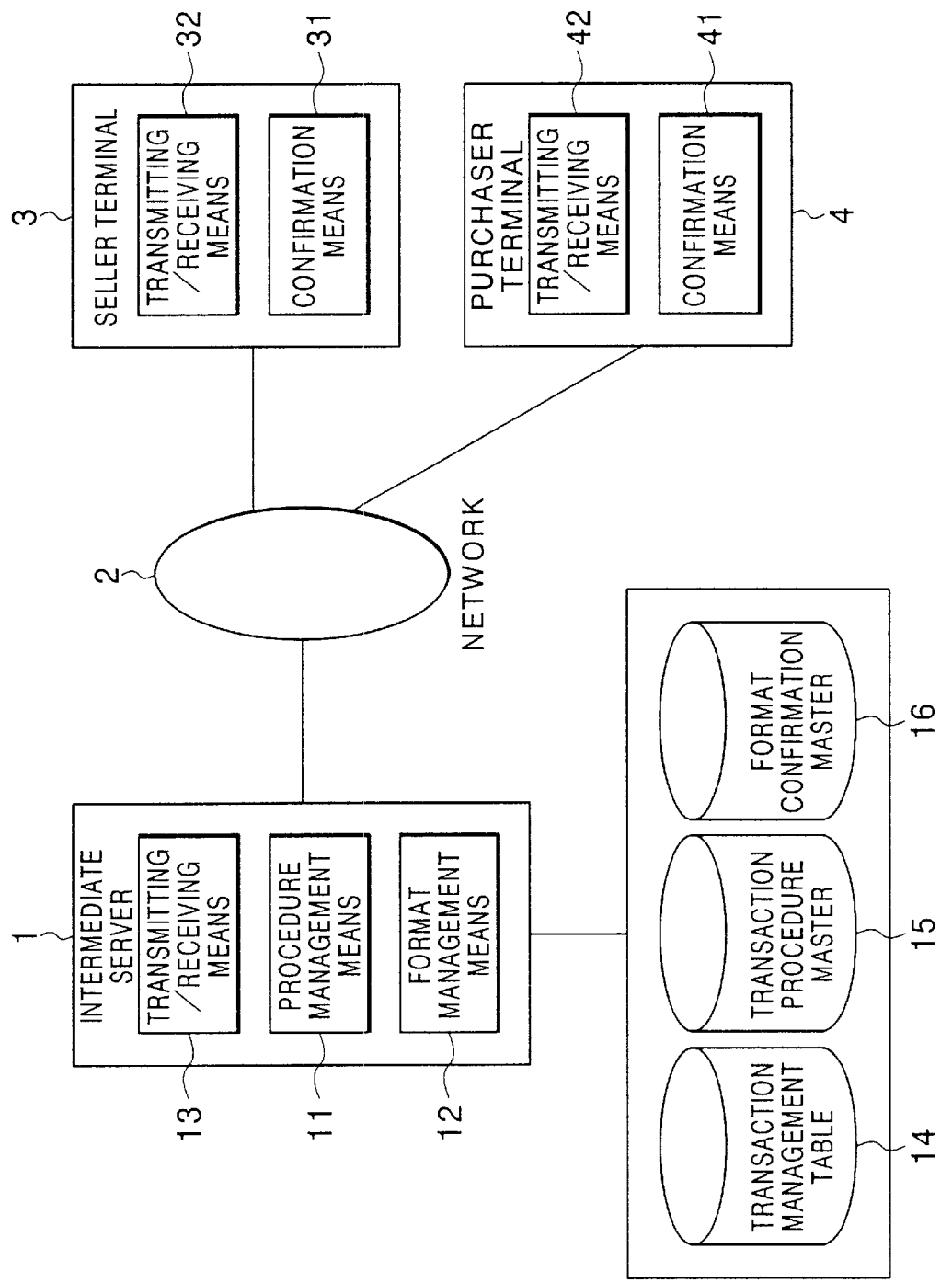
FIG. 1 is a diagram showing the configuration of a transaction management system according to the present invention.

FIG. 1 is a transaction management system block diagram showing the configuration of a transaction management system according to the present invention.

The transaction management system comprises an intermediate server 1, a seller terminal 3, a purchaser terminal 4, and a network 2 for interconnecting them. The seller terminal 3 and the purchaser terminal 4 make a transaction (network service transaction) of a commodity or service employing (via) the network 2. Which is, the seller terminal 3 sells the commodity on the network 2, and the purchaser terminal 4 purchases the commodity on the network 2. The intermediate server 1 intermediates the network service transaction between the seller terminal 3 and the purchaser terminal 4. The network 2 is the Internet, for example.

One or more seller terminals 3 and one or more purchaser terminals 4 are provided. The seller terminal 3 is a terminal unit or a computer provided for the seller. The purchaser terminal 4 is a terminal unit or a computer provided for the purchaser. The intermediate server 1 is a server or a computer provided for the intermediary, and opens an intermediation site on the Internet 2. The intermediary is a third party other than the seller and the purchaser, and intermediates the network service transaction between the seller and the purchaser. The intermediate server 1 may be provided to enhance the value added by the Internet provider (application service provider).

The intermediate server 1 intermediates the transmission or reception of the data (transmission or reception data 17, see FIG. 2D) to be transmitted or received between the seller terminal 3 and the purchaser terminal 4 in the network service transaction between the seller terminal 3 and the purchaser terminal 4, in accordance with the transaction procedure determined by the transaction type and its attribute information. In this process, the intermediate server 1 confirms the procedure (order of progress) for the transmission or reception data 17, its format, and the consistency of items in the format. Also, the intermediate server 1 receives identification information (transaction ID) identifying uniquely the transaction from either the seller terminal 3 or the purchaser terminal 4, when the transaction is interrupted at any of plural steps, and resumes the transaction from an interrupted step on the basis of the stored identification information and the received identification information.

Therefore, the intermediate server 1 comprises procedure management means 11, format management means 12, and transmitting or receiving means 13, and further comprises a transaction management table 14, a transaction procedure master 15, and a format confirmation master 16. Each of the procedure management means 11, the format management means 12 and the transmitting or receiving means 13 is a program to execute each processing, and realized by executing in a CPU the program implemented on a main memory. The transaction management table 14 is generated by the procedure management means 11. The transaction procedure master 15 and the format confirmation master 16 have the predetermined contents and are prepared.

These programs are stored and provided in a suitable recording medium such as a floppy disk, CD-ROM or CDR/W. Thereby, the intermediate server 1 which is implemented by these programs can be easily realized.

By determining the transaction procedure master 15 and the format confirmation master 16, the format employed in the transaction procedure and other procedures is determined. They are determined in practice by the seller terminal 3. However, since the procedure is once registered in the intermediate server 1 which is the neutral third party and proceeds under its approval, the purchaser feels at rest about the procedure which is assured. In practical use, the intermediate server 1 can determine the transaction procedure, as will be described later, and thereby is kept neutral from this respect.

The procedure management means 11 manages the transaction procedure, employing the transaction management table 14 and the transaction procedure master 15. Which is, it generates and updates the transaction information for the transaction management table 14. Also, the procedure management means 11 demands the format management means 12 to judge the consistency of the used procedure and format. If the consistency of the used procedure and format is judged to be proper by the format management means 12, the procedure management means 11 demands the transmitting and receiving means 13 to transmit the information indicating the properness and the next used procedure and format (next procedure and next format) as required.

The format management means 12 accepts a request from the procedure management means 11, and checks the format (format) for the procedure, employing (transaction management table 14 and) the format confirmation master 16. Which is, it is checked whether or not the procedure is correct in the transaction, and whether or not the format and the contents of items for the procedure to be transmitted or received in the procedure are correct.

The transmitting and receiving means 13 accepts and passes the procedure transmitted from the seller terminal 3 or the purchaser terminal 4 to the procedure management means 11. Also, the transmitting and receiving means 13 accepts a request from the procedure management means 11 and transmits the procedure to the seller terminal 3 or the purchaser terminal 4.

The seller terminal 3 comprises confirmation means 31 and transmitting/receiving means 32. The purchaser terminal 4 comprises confirmation means 41 and transmitting/receiving means 42. The confirmation means 31 and the transmitting/receiving means 32 perform (or execute) the same processing as the confirmation means 41 and the transmitting/receiving means 42. The confirmation means 31 confirms the information received from the intermediate server 1 or the purchaser terminal 4 and then performs a predetermined processing. The transmitting/receiving means 32 accepts the information transmitted from the intermediate server 1 or the purchaser terminal 4 and passes it to the confirmation means 31. Also, the transmitting/receiving means 32 accepts a request from the confirmation means 31, and transmits the information to the intermediate server 1 or the purchaser terminal 4. The confirmation means 41 and the transmitting/receiving means 42 are the same.

FIG. 2 is an explanatory diagram for the intermediate server, showing one example of the transaction management table 14, the transaction procedure master 15, the format confirmation master 16 and the transmission or reception data 17.

The transaction management table 14 stores a plurality of pieces of transaction information, as shown in FIG. 2A. One piece of transaction information is composed of dealers #1 and #2, transaction type, transaction condition, and receiving format for each transaction ID. A transaction ID is the identification information for uniquely identifying the transaction, and is necessarily appended for transmission and reception of the data after it is appended. The dealers #1 and #2 are the information indicating the interested party for the network service transaction, in which the seller is registered in the dealer #1 and the purchaser is registered in the dealer #2, for example. The transaction type is the identification information for uniquely determining a set of transaction procedures. The transaction condition is the information indicating which procedure is executed among the plurality of transaction procedures in the transaction type. The reception format is the information indicating the format (name of format) for use in the transaction procedure performed.

One piece of transaction information is generated by the procedure management means 11 every time the transaction arises, and updated in accordance with the transaction procedure master 15 every time the transaction procedure proceeds. Which is, the transaction condition and the reception format are updated. The transaction condition is updated to the next procedure when a procedure format is executed to the end. The reception format is updated to the next format after execution. Accordingly, the transaction management table 14 stores the procedure for use in the transmission or reception, corresponding to the identification information, every time of transmitting or receiving the transmission or reception data 17 between the seller terminal 3 and the purchaser terminal 4 in the network service transaction. By leaving a log in this transaction management table 14, all the transaction results can be left.

The transaction procedure master 15 stores the transaction procedure and its attribute information for each transaction type, as shown in FIG. 2B. More specifically, it stores a transaction mark, procedure #1, format of procedure #1, procedure #2, format of procedure #2, and so on for each transaction type. The transaction mark is one of the attribute information for the transaction type, and the information indicating a mark (kind of mark or file name) displaying on the seller terminal or the purchaser terminal that the transaction (or transmission/reception of data) is performed. Procedure #1 is the information indicating the procedure (name of procedure) to be executed at first in the transaction. Format of procedure #1 is the information indicating the format (name of format) for use in the procedure #1. Procedure #2 is the information indicating the procedure (name of procedure) to be executed at second time in the transaction. Format of procedure #2 is the information indicating the format (name of format) for use in the procedure #2. In the same manner, procedures for use in the transaction types are defined in due order.

In this way, a plurality of procedures for each transaction type are stored in the transaction procedure master 15 in due order, whereby the transaction procedure is determined for the transaction type. Also, the attribute information is stored for each of the plurality of procedures, thereby making definite the data to be transmitted or received in the procedure. The attribute information of the transaction procedure master 15 is useful for confirming the format of data to be transmitted or received in each of the plurality of procedures.

Herein, the transaction mark is employed as the mark indicating the transaction type, but besides that, may be used as the mark indicating the format of procedure (card information, address input).

The format confirmation master 16 stores the attribute information, as shown in FIG. 2C. More specifically, it stores check items for each format of transaction type. The check items include check items and check contents in the format. More specifically, it is indicated to check the coincidence ("equality") between an item of a format and the item of another format. With this attribute information, it is possible to confirm the consistency between the data transmitted from the seller terminal 3 and the data transmitted from the purchaser terminal 4 in each of the plurality of procedures.

The transmission or reception data 17 has an IP address of a caller (originator), an IP address of a destination, transaction ID and the format including input data, as shown in FIG. 2D. The format including input data is the proper content to be transmitted. At this time, in the case where the originator or the destination can not be specified by the IP address, the registered ID or password may be authenticated.

FIGS. 3 to 6 are explanatory tables for procedure, showing one example of practical transaction procedure which is defined by the transaction procedure master 15 of FIG. 2B as previously described in the intermediate server 1 of the invention.

FIG. 3 shows a transaction procedure for selling or buying the general consumer goods in accordance with the network service transaction conformable to the transaction management method of the invention.

This is a practical example, and the procedure is complex. Therefore, the procedure can not be represented as "X01-001", as previously described, but is represented at two stages of large classification and small classification such as "X01-01-001" (see FIGS. 4 to 6). For example, in the transaction "X01", when the procedure "before selling or buying" is large classification, "X01-01" is defined, and when the procedure "providing the information of commodity to be sold" is small classification, "X01-01-001" is defined. Other procedures are similarly defined (partly shown in FIG. 3, and the same in FIG. 4). Accordingly, the procedure can be more intricate in hierarchical structure, and a middle classification may be defined between large classification and small classification, for example.

The progress of procedure may not be successive, as opposed to that previously described. For example, procedure "commodity arrival" and procedure "payment" are performed in parallel after completion of "before commodity arrival", and after both procedures are completed, the "cooling off" is performed.

Moreover, the procedure is not only requisite procedure, but may include an optional procedure, as opposed to that previously described. For example, the procedure "cooling off" may or may not be performed, and takes a period of two weeks or so before execution. In this case, however, the transaction management table 14 (transaction information) is saved for a longer period. Thereby, even if the procedure is executed after the elapse of longer period, the intermediate server 1 can respond to this procedure.

FIGS. 4 and 5 show the procedure in the transaction for selling or buying the consumer durable goods in accordance with the network service transaction conformable to the transaction management method of this invention by making up one drawing.

In this example, the procedure "maintenance" that takes a very long period before execution is included, and may not be necessarily performed. For example, if the consumer durable goods is a new automobile for private use, there are three years till the first automobile inspection. The maintenance may be made at a different company from the distributor. In this case, however, the transaction management table 14 (transaction information) is saved for a longer period than three years.

Accordingly, the processing time may be defined for each of the large classification and small classification for the procedure in this case (and the example of FIG. 3). For example, the processing time for large classification "maintenance" for the procedure may be three years, and the other processing time for large classification for the procedure such as "before selling or buying" may be one day. Except for the large classification "maintenance for procedure, a time-out occurs in only one day, and the transaction information is deleted, whereby the memory capacity may be small. A different processing time may be defined for each large classification (or small classification) for procedure.

FIG. 6 shows the transaction procedure for notifying the change of address in accordance with the network service transaction conformable to the transaction management method of this invention. This example is not a transaction (commercial transaction), but this invention can be applied without problem considering that it is a conduct for paying a fee as a compensation of service for moving a resident card.

In this example, a terminal (hereinafter referred to as an autonomy terminal 3) corresponding to the seller terminal 3 is placed at each of two sites of A self-governing community and B self-governing community (practically the same for a "payment authorized agency terminal" in FIG. 3). Further, in the progress of large classification "autonomy removal notice process" of the same procedure, it is required to have two autonomy terminals 3 as the communication destination. Accordingly, this example is also complex in procedure. Which is, two autonomy terminals 3 are registered for the dealer #1 (seller) in the transaction management table 14, and the communication destination must be suitable selected in the procedure being executed at present in the transaction condition.

Referring to FIG. 7, the intermediate process in the intermediate server 1 will be described below in detail. FIG. 7 is a transaction management processing flowchart, showing the transaction management process in the intermediate server 1 of the invention.

The procedure management means 11 generates the transaction management table 14 (step S11). At this time, the contents of the transaction management table 14 are empty.

If a plurality of procedures and its format in a certain transaction are transmitted from the seller terminal 3 (step S12), the procedure management means 11 (or format management means 12) that receives them via the transmitting/receiving means 13 registers the relevant contents in the transaction procedure master 15 and the format confirmation master 16 (step S13). By specifying the transaction procedure master 15 and the format confirmation master 16, as previously described, the transaction procedure and the format can be determined.

The transaction mark may be created and transmitted by the seller terminal 3, or created and prepared by the intermediate server 1. Alternatively, the seller terminal 3 may select one from among the transaction marks prepared by the intermediate server 1.

For example, if a transaction mark "X01.jpg" is determined for a transaction of transaction type "X01" in the transaction procedure master 15, as shown in FIG. 2B, the mark stored in a file of that fine name is displayed on the purchaser terminal (or the seller terminal as required) during the period of transmitting or receiving the transaction data. If "X01-001" and "X01-002" are determined in the procedures #1 and #2, the transaction of transaction type X01 can progress in the order of procedure X01-001, procedure X01-002, . . . If "X01-001-P1, X01-001-P2" are determined in the format of procedure #1, format X01-001-P1 and format X01-001-P2 are employed in the procedure X01-001 in this order.

In the format confirmation master 16, if the check item "X01-001-P2-01=X01-001-P1-03" is determined for the format "X01-002-P2" of transaction type "X01", as shown in FIG. 2C, it is checked whether or not the item "01" of format X01-002-P2 is equal to the item "03" of format X01-001-P1 immediately before. For example, the item "01" is the selling price, and the item "03" is the purchase price.

In practice, it is desirable that the intermediate server 1 determines the transaction mark and the transaction procedures with its order (i.e., transaction procedure master 15, format confirmation master 16) for each transaction type. Thereby, the procedure can be unified for a number of transactions, so that the purchaser can further feel at rest. On the other hand, the seller terminal 3 can dispense with the trouble of creating the procedure. Accordingly, the seller terminal 3 designates the format itself for use in a certain procedure in the transaction at step S12. Specifically, the seller terminal 3 designates a page at which the seller publicizes the commodity, a page for displaying the service covenant, or a page at which the purchaser inputs the condition.

Thereafter, the purchaser terminal 4 transmits some data (transmission or reception data 17) to the intermediate server 1 at an appropriate timing (step S14). The seller terminal 3 may transmit the transmission or reception data 17 as indicated by the dotted line in FIG. 7.

The procedure management means 11 examines whether or not the data is received by the transmitting/receiving means 13 (step S15) If not received, step S14 is repeated. If received, the procedure management means 11 retrieves the transaction ID from the data (step S16), and examines the presence of absence of the transaction ID (step S17).

If there is no transaction ID, the transaction newly arises, whereby the procedure management means 11 creates the transaction information for the transaction, and stores it in the transaction management table 14 (step S18). Then, the operation proceeds to step S20.

For example, suppose that the received data is the data for starting the transaction of transaction type "X01" from the purchaser terminal 4 having an IP address "B12345" to the seller terminal 3 having an IP address "A12345". In this case, the procedure management means 11 appends the transaction ID "T001", for example, to the transaction, as shown in FIG. 2A, creates the transaction information on the basis of the data, as previously described, and registers it in the transaction management table 14. At this time, the procedure management means 11 acquires the first procedure #1 "X01-001" of transaction type "X01" and its formats "X01-001-P1" and "X01-001-P2" by referring to the transaction procedure master 15, registers the first procedure "X01-001" of the transaction in the transaction condition, and registers the first reception format "X01-001-P1" for use in the procedure #1 of the transaction in the reception format.

The transaction ID is appended in the order in which the procedure management means 11 receives the data without the transaction ID. In the example of FIG. 2A, the later transaction T002 is ahead of the earlier transaction T001 in the progress of procedure.

If there is the transaction ID at step S17, the procedure of the transaction is in progress. Therefore, the procedure management means 11 refers to the transaction management table 14, using the transaction ID (step S19). Then, the format management means 12 checks the procedure of the transaction and its format, using the format confirmation master 16 (and the transaction management table 14) (step S20). Then, it is checked whether or not the result of check is correct (step S21). Only if it is correct, the procedure management means 11 updates the transaction information of the transaction management table 14 to indicate the next procedure or the next format, as required (step S22).

For example, if the transaction ID "T001" is appended, the procedure management means 11 refers to the transaction management table 14, employing this transaction ID, retrieves the transaction information, and passes the transaction information and the data received at step S15 to the format management means 12. The format management means 12 checks whether or not the received data involves the procedure "X01-001" being executed at present in the transaction and whether or not it has the format "X01-001-P1" employed in the procedure being executed at present.

Also, the format management means 12 checks whether or there is any check item for the received data, employing the format confirmation master 16, and if so, checks whether or not that check item is correct. For example, the next format "X01-001-P2" of the format "X01-001-P1" is passed to the format management means 12, because there is some check item for the format "X01-001-P2", the format management means 12 checks whether or not the check item is correct. Which is, it is checked whether or not the format "X01-001-P2" is equal to the item "03" of the former format "X01-001-P1".

The check item does not need to reside within the same procedure, but may reside within the other procedure. Hence, the format management means 12 saves the data passed from the procedure management means 11 with its transaction ID, the procedure (name) and the format (name) by linking them to the column of check item in the format confirmation master 16. Accordingly, if the format does not arise in the check item, they may not be saved. The retention period is until the transaction information of transaction ID is deleted from the transaction management table 14, for example. Which is, they are deleted at the same time.

The format management means 12 notifies the check result to the procedure management means 11. If all the check results are correct, the procedure management means 11 refers to the transaction procedure master 15 and updates the transaction management table 14 as required. For example, if the transaction condition for the transaction of transaction ID "T001" is "procedure #1", and the reception format is "X01-001-P1", the next format resides within the same procedure, whereby the reception format is updated to the next format "X01-001-P2". Also, if the transaction condition is "procedure #1" and the reception format is "X01-001-P2", the procedure is updated to the next procedure "procedure #2". Along with this, the reception format is updated to "X01-002-P1".

For example, in a case where the transaction condition is "procedure #2" and the reception format is "X01-002-P1" for the transaction of transaction ID "T001", suppose that any of the intermediate server 1, the network 2, the seller terminal 3 and the purchaser terminal 4 has failed to interrupt the progress of transaction. In this case, the progress of transaction can be resumed from "X01-002-P1" of "procedure #2". Which is, the transaction information in the transaction management table 14 is deleted only if no data for the transaction is received for a fully long period. For example, it is difficult to consider that it takes several days for the network 2 to recover from the failure, the transaction information is saved for one day (24 hours), and then deleted. Accordingly, the seller terminal 3 or the purchaser terminal 4 resumes the transaction from "X01-002-P1" of "procedure #2" after interruption, thereby continuing the transaction.

Thereafter, the procedure management means 11 transmits the predetermined information via the transmitting/receiving means 13 to the seller terminal 3 or the purchaser terminal 4 which is the transmitting source in accordance with the check result, as indicated by the dotted line in FIG. 7, or to the purchaser terminal 4 or the seller terminal 3 which is the receiving destination (step S23), thereby repeating the steps following step S15. Which the receiving destination is the seller terminal 3 or the purchaser terminal 4 can be determined dependent on which transaction management method is employed as shown in FIG. 8.

The seller terminal 3 or the purchaser terminal 4 which is the receiving destination is notified of the information indicating whether or not the check result is correct, and the procedure and format to be followed in transmitting or receiving the transmission or reception data 17 at the next time, if the check result is correct. For example, the transaction ID, transaction mark (or its image data), first procedure "X01-001", and first format "X01-001-P1" are returned to the purchaser terminal 4 (or the seller terminal 3). The notification of the procedure and format is made by transmitting the procedure name and format name, but not transmitting the procedure and the format data (or its image data) The transaction mark may be appended only at the first communication in the transaction.

The purchaser terminal 4 (or seller terminal 3) that receives the transaction mark displays it on the display unit (step S24). This mark is displayed at any time or continuously till the end of the transaction. For example, it is displayed while the transmission or reception of the transaction data is being made between the seller terminal 3 and the purchaser terminal 4 via the intermediate server 1. Thereby, the purchaser (and seller) knows that the transaction is made normally, and feels easy.

If the check result is incorrect at step S21, it is notified that the check result is incorrect at step S23, and the mark indicating that the check result is incorrect is displayed at step S24. Alternatively, the mark indicating the check result is incorrect may be displayed till the check result becomes correct.

The purchaser terminal 4 (or seller terminal 3) appends the transaction ID in the communication with the intermediate server 1 (or seller terminal 3) for the ensuing transaction. Also, the purchaser terminal 4 transmits the transmission or reception data to the intermediate server 1 in the transmission at the next time, employing the format notified in the notified procedure.

Referring to FIGS. 8 to 11, the transaction management with the intermediate server of the invention will be described in detail.

FIG. 8 is an explanatory diagram for transaction management showing one example of the transaction procedure with the intermediate server 1 of the invention.

Figure 8A:
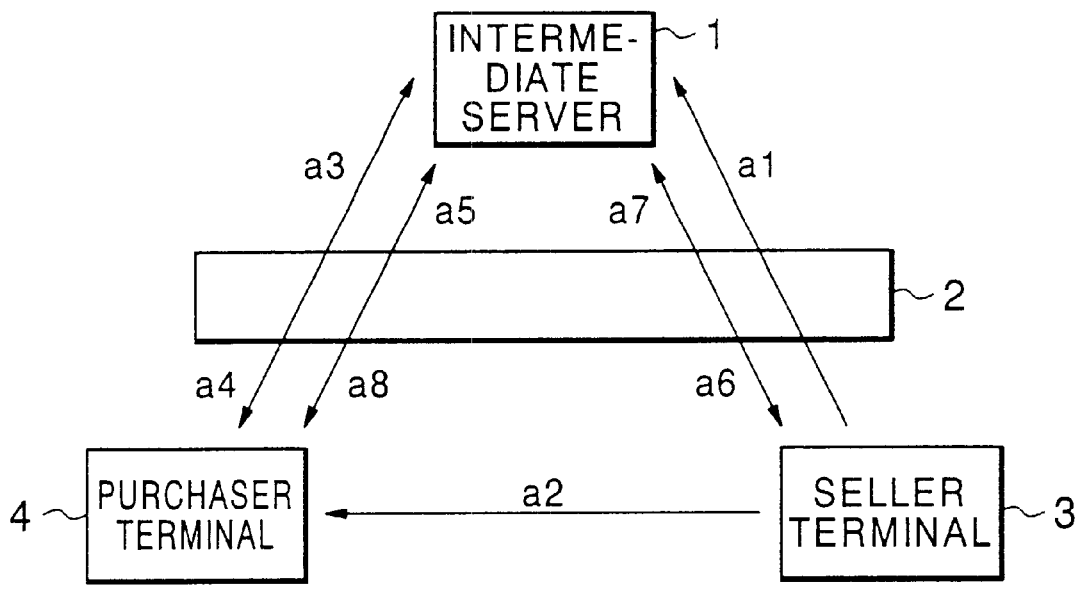
FIGS. 8A and 8B show one example of managing the transaction procedure via the intermediate server of the invention.

As shown in FIG. 8A, the seller terminal 3 registers a format in the intermediate server 1 (i.e., transaction procedure master 15) (process a1), and publicizes (transmits) the format if there is an access from the purchaser terminal 4 (process a2). In this example, the seller terminal 3 can register the format alone in the intermediate server 1. Also, the seller terminal 3 can register the check items in the format confirmation master 16, as required. In this example, the purchaser terminal 4 acquires the format for transmitting the transmission or reception data 17 from the seller terminal 4, but not from the intermediate server 1 (however, the purchaser terminal 4 may acquire the format from the intermediate server 1).

The purchaser terminal 4 inquires the intermediate server 1 about the content of the format publicized (process a3), and receives a notification of whether it is correct or not from the intermediate server 1 (process a4). At this time, the intermediate server 1 produces the transaction information in the process a3, and registers it in the transaction management table 14, with the transaction ID appended. Then, the intermediate server 1 checks whether or not the inquired format is coincident (correct) with the format in the procedure described in the transaction procedure master 15. If this format is correct, the intermediate server 1 returns an indication of correctness and the procedure and format (i.e., the inquired format in this case) at the next time, or otherwise, returns an error message. Thereby, the purchaser terminal 4 can guarantee the procedure and format.

If the format is correct, the purchaser terminal 4 inputs the predetermined data in the format, and transmits it to the intermediate server 1 (process a5). The intermediate server 1 that receives the format submits (transmits) the received format to the seller terminal 3 (process a6). At this time, for example, the intermediate server 1 compares the item (e.g., selling price) of the format received in the process a3 and the item of the format (e.g., purchase price) received in the process a5 in accordance with the format confirmation master 16 to make an item check.

The seller terminal 3 transmits a complete notification of accepting the format (process a7), and the intermediate server 1 that receives it transmits a complete notification of transaction to the purchaser terminal 4 (process a8).

Figure 8B:
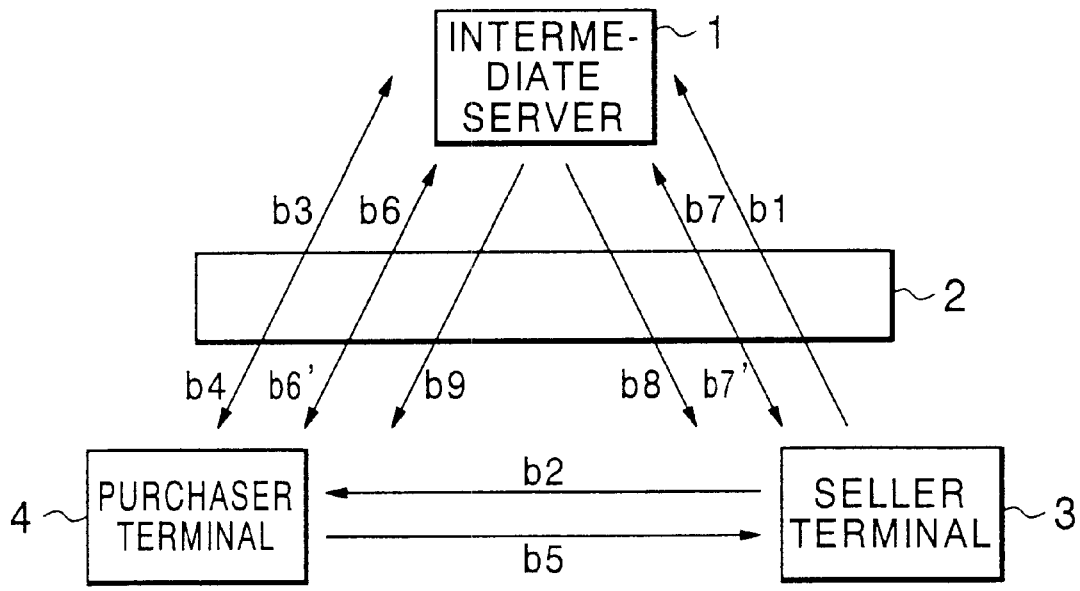

As shown in FIG. 8B, the seller terminal 3 registers the format in the intermediate server 1 (process b1), and publicizes the format to the purchaser terminal 4 (process b2) the purchaser terminal 4 introduces the content of the format to the intermediate server 1 (process b3), and receives a notification of whether or not the format is correct (process b4), as in FIG. 8A. If the format is correct, the purchaser terminal 4 inputs the predetermined data in the format and submits the format directly to the seller terminal 3, but not the intermediate server 1 (process b5), transmits the information (file log) indicating the submission to the intermediate server 1 (process b6), and receives a notification of confirming the content of the log (process b6'). On the other hand, the seller terminal 3 that receives the format transmits the introduction for the content of the format submitted to the intermediate server 1 (process b7), and receives a notification of confirming the content (process b7'). Moreover, the intermediate server 1 that confirms the content transmits a complete notification to each of the seller terminal 3 and the purchaser terminal 4 (process b8 and process b9).

FIG. 9 is an explanatory diagram for transaction management showing another example of transaction procedure management in the intermediate server 1 of the invention.

Figure 9A:
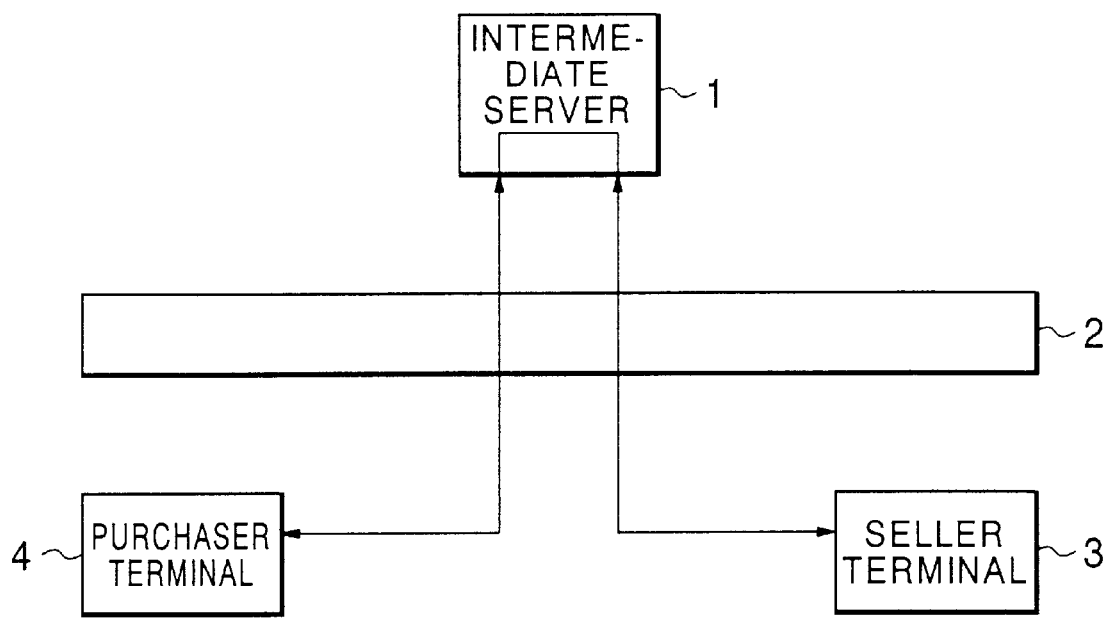
FIGS. 9A and 9B show another example of managing the transaction procedure via the intermediate server of the invention.

As shown in FIG. 9A, the transmission or reception data 17 is transmitted or received via the intermediate server 1 between the seller terminal 3 and the purchaser terminal 4. In this case, every time the transmission or reception data 17 is transmitted or received, a check for the procedure and format is made. Accordingly, the intermediate server 1 has a large processing load, but the security of transaction can be assured. Since it is unnecessary for the seller or purchaser (user) to be aware of the transmitting destination, the user has no load.

Figure 9B:
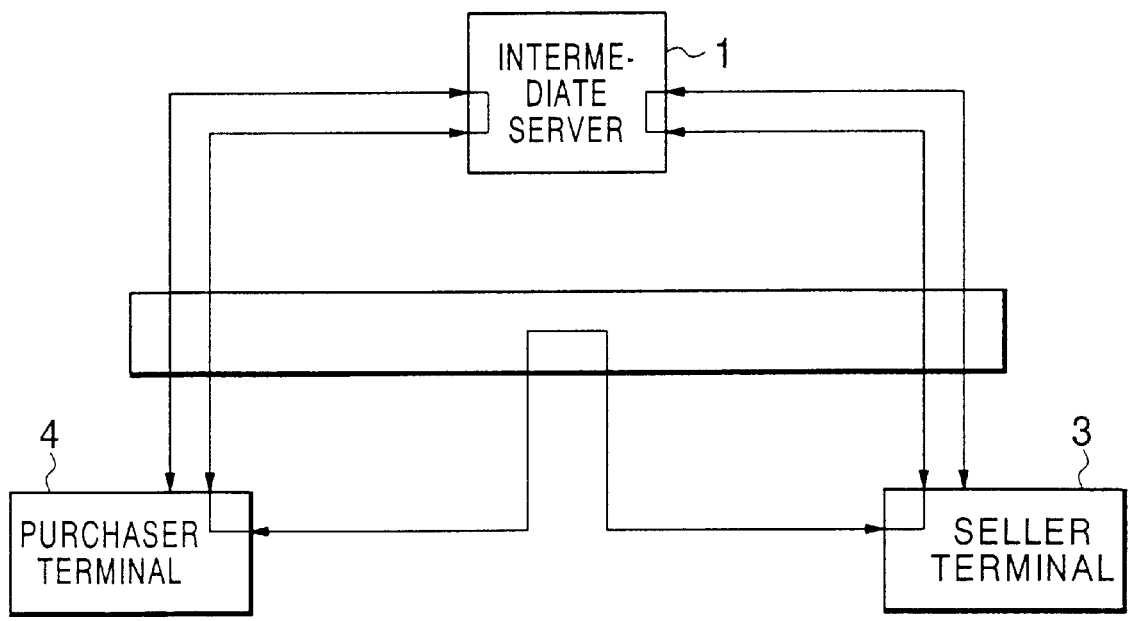

As shown in FIG. 9B, the transmission or reception data 17 may be transmitted or received directly (via the network 2) between the seller terminal 3 and the purchaser terminal 4. In this example, however, a confirmation (check for the procedure and format) is made for the transmission data between the transmitting side (i.e., one side of the seller terminal 3 and purchaser terminal 4) and the intermediate server 1, before the transmission. After receiving the data, a confirmation (check for the procedure and format) is made for the received data between the data receiving side (i.e., the other of the seller terminal 3 and the purchaser terminal 4) and the intermediate server 1. In this case, there is no need of being aware of the seller or the purchaser (user) in the communication between the seller terminal 3 or purchaser terminal 4 and the intermediate server 1. Which is, because the seller terminal 3 or the purchaser terminal 4 performs the processing before transmitting or after receiving the transmission or reception data 17, the user has no load.

FIG. 10 is an explanatory diagram for transaction management showing another example of transaction procedure management via the intermediate server 1 of the invention. FIG. 10 is a variation example of the transaction management as shown in FIG. 9A.

Figure 10A:
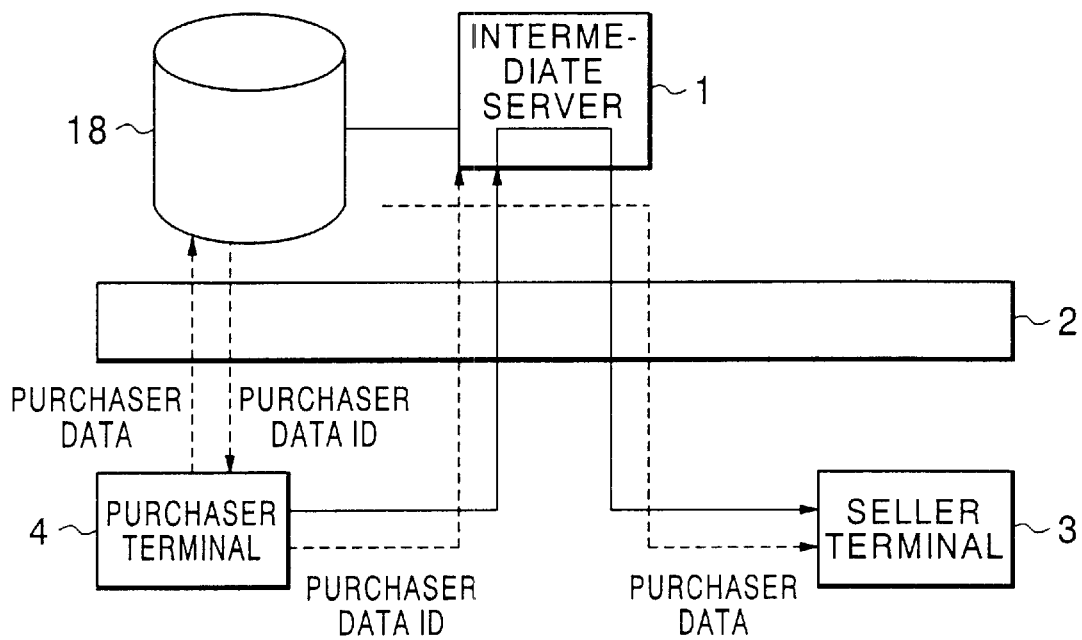
FIGS. 10A and 10B show another example of managing the transaction procedure via the intermediate server of the invention.

As shown in FIG. 10A, the purchaser terminal 4 may register in advance the profile data (purchaser data) 18 in the intermediate server 1. This registration may be made by mail, for example (the same applies in the following figures). In response to this registration, the intermediate server 1 transmits the purchaser data to the purchaser terminal 4, with the purchaser data ID appended (as indicated by the arrow from the purchaser date 18 for reasons of expediency on the drawing. Same in the following figures). Accordingly, the purchaser terminal 4 employs the purchaser data ID in making access to the intermediate server 1, without transmitting the purchaser data 18. However, if it is required to have the data unregistered in the purchase data 18, a request is made for only the required data to the purchaser terminal 4, whereby the data input from the purchaser terminal 4 is saved in the purchaser data 18. The intermediate server 1 identifies the purchaser on the basis of the purchaser data ID received, and transmits the registered purchaser data 18 to the seller terminal 3 by appending it to the received data from the purchaser terminal 4. Thereby, it is unnecessary to transmit the purchaser data 18 between the purchaser terminal 4 and the intermediate server 1 every time, resulting in less amount of transmission data.

Figure 10B:
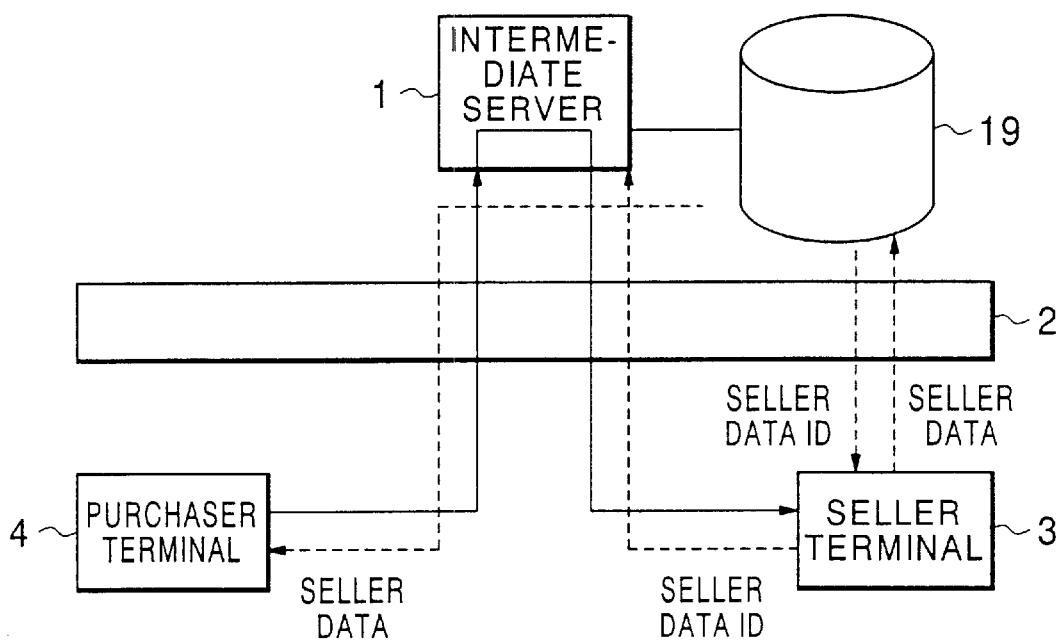

As shown in FIG. 10B, the seller terminal 3 may register in advance the profile data (seller data) 19 in the intermediate server 1. In response to this registration, the intermediate server 1 transmits the seller data to the seller terminal 3, with the seller data ID appended. Accordingly, the seller terminal 3 employs the seller data ID in making access to the intermediate server 1, without transmitting the seller data 19. The intermediate server 1 identifies the seller on the basis of the seller data ID received, and transmits the registered seller data 19 to the purchaser terminal 4 by appending it to the received data from the seller terminal 3. Thereby, it is unnecessary to transmit the seller data 19 between the seller terminal 3 and the intermediate server 1 every time, resulting in less amount of transmission data.

The intermediate server 1 may have both the purchaser data 18 and the seller data 19. In this case, the amount of transmission data can be reduced between the purchaser terminal 4 or the seller terminal 3 and the intermediate server 1.

FIG. 11 is an explanatory diagram for transaction management showing another example of transaction procedure management via the intermediate server 1 of the invention. FIG. 11 is a variation example of the transaction management as shown in FIG. 9B.

Figure 11A:
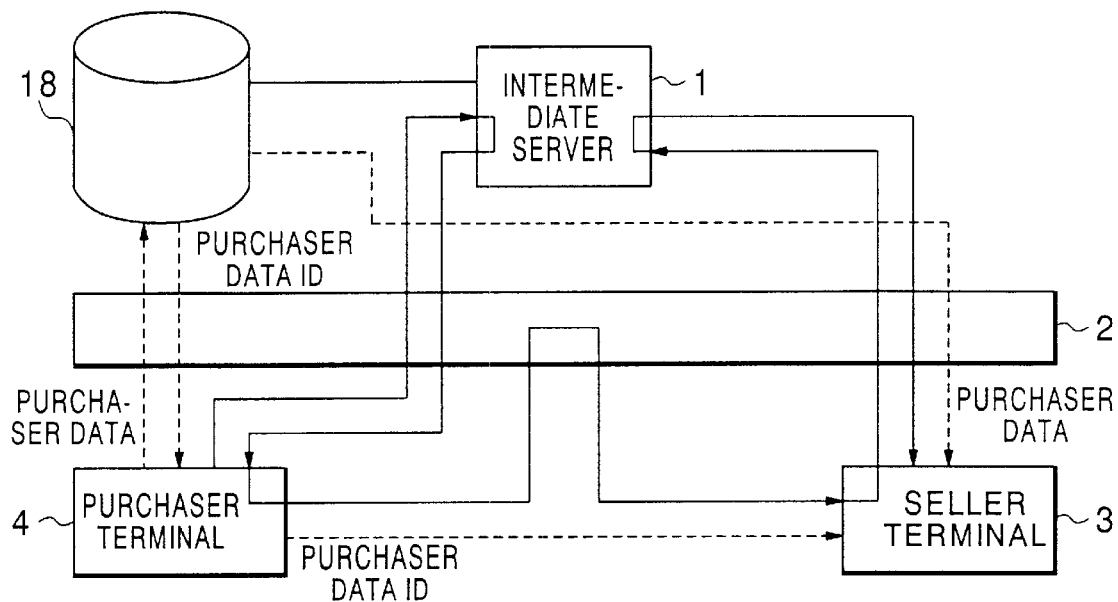
FIGS. 11A and 11B show another example of managing the transaction procedure via the intermediate server of the invention.

As shown in FIG. 11A, the purchaser terminal 4 may register in advance the purchaser data in the intermediate server 1, and the intermediate server 1 may append the purchaser data ID in the purchaser terminal 4, as in FIG. 10A. Thereby, it is unnecessary to transmit the purchaser data 18 between the purchaser terminal 4 and the intermediate server 1 every time, resulting in less amount of transmission data.

Figure 11B:
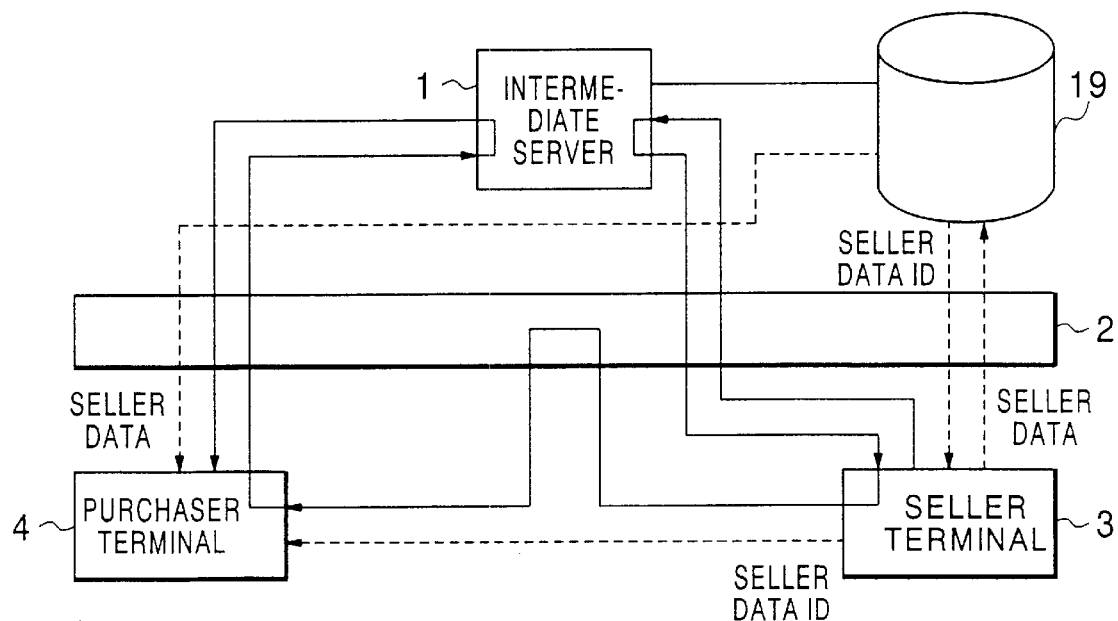
Figure 13:
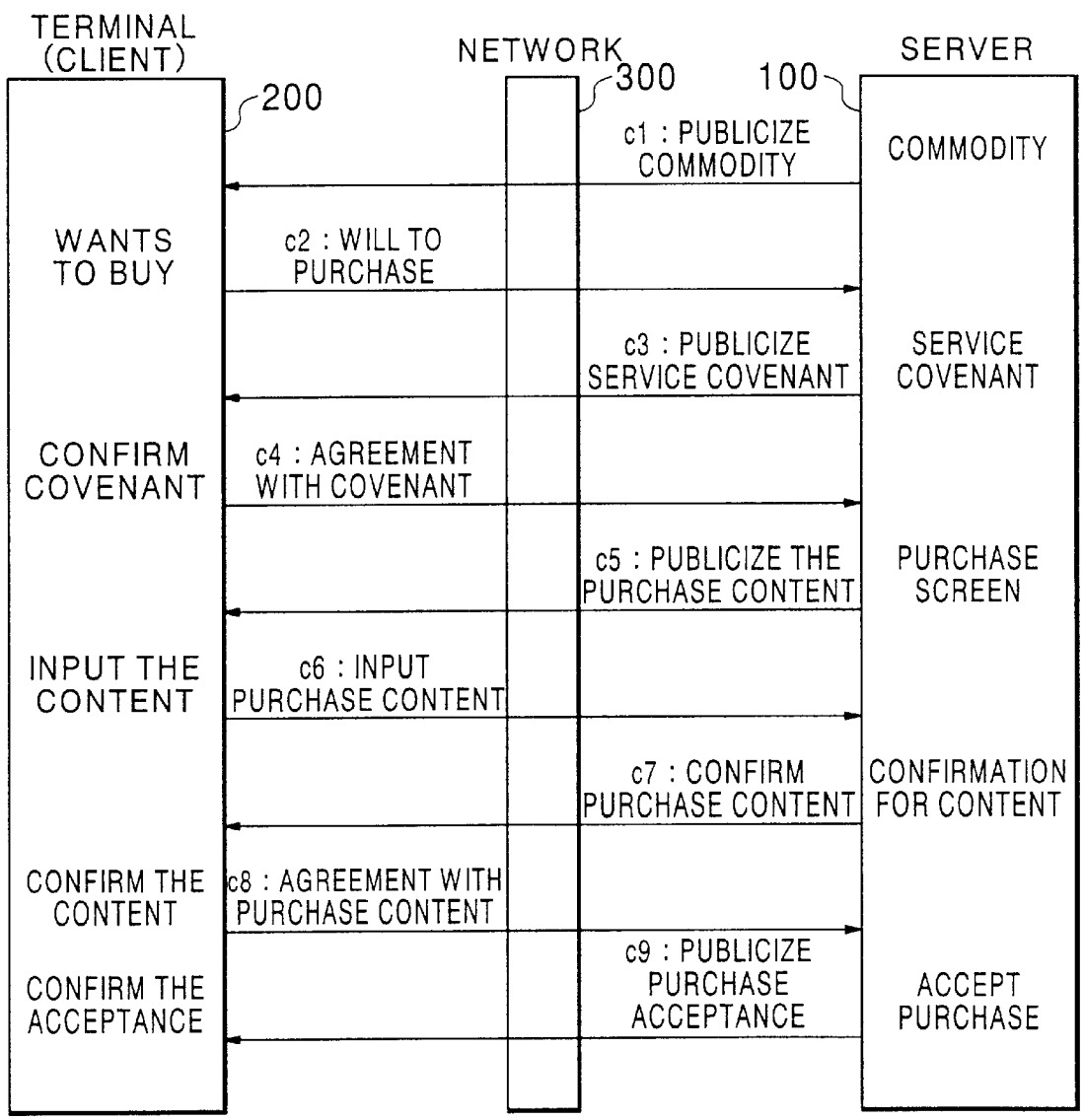
FIG. 13 is a diagram showing the related art.

As shown in FIG. 11B, the seller terminal 3 may register in advance the seller data in the intermediate server 1, and the intermediate server 1 may append the seller data ID in the seller terminal 3, as in FIG. 10B. Thereby, it is unnecessary to transmit the seller data between the seller terminal 3 and the intermediate server 1 every time, resulting in less amount of transmission data, as in FIG. 10B.

The intermediate server 1 may have both the purchaser data 18 and the seller data 19. In this case, the amount of transmission data can be reduced between the purchaser terminal 4 or the seller terminal 3 and the intermediate server 1.

The transaction management methods as shown in FIGS. 10 and 11 may be appropriately combined. Which is, the actual transaction management as shown in FIG. 8 is a combination of the transaction management methods as shown in FIGS. 10 and 11, but the purchaser data 18 and/or the seller data 19 may be provided in each transaction management.

FIG. 12 is an explanatory diagram for transaction management showing another example of transaction procedure management via the intermediate server 1 of the invention. FIG. 12 is a variation example of the transaction management as shown in FIGS. 10A and 10B.

As indicated by the dotted line in FIG. 12, the purchaser terminal 4 registers in advance the purchaser data 18 in the intermediate server 1A, and the intermediate server 1A transmits the purchaser data ID to the purchaser terminal 4. The seller terminal 3 registers in advance the seller data 19 in the intermediate server 1B, and the intermediate server 1B transmits the seller data ID to the seller terminal 3. Moreover, the intermediate server 1A and the intermediate server 1B are approvable from each other via the network 2, and can transmit or receive (exchange) the data. The purchaser data 18 for the intermediate server 1A may be transmitted in advance to the intermediate server 1B, and the seller data 19 for the intermediate server 1B may be transmitted in advance to the intermediate server 1A.

Accordingly, if the purchaser terminal 4 makes access to the intermediate server 1A, employing the purchaser data ID, as in FIG. 10A, the intermediate server 1A transmits the purchaser data 18 corresponding to the purchaser data ID appended to the received data to the intermediate server 1B, as indicated by the dashed line in FIG. 12. The intermediate server 1A may also transmit the purchaser data ID. In this case, the intermediate server 1B identifies the purchaser on the basis of the purchaser data ID received, and transmits the purchaser data 18 received in advance from the intermediate server 1A to the seller terminal 3 by appending it to the received data from the purchaser terminal 4. Also, if the seller terminal 3 makes access to the intermediate server 1B, employing the seller data ID, as in FIG. 10B, the intermediate server 1B transmits the seller data 19 corresponding to the seller data ID appended to the received data to the intermediate server 1A, as indicated by the dashed line in FIG. 12. The intermediate server 1B may also transmit the seller data ID. In this case, the intermediate server 1A identifies the seller on the basis of the seller data ID received, and transmits the seller data 19 received in advance from the intermediate server 1B to the purchaser terminal 4 by appending it to the received data from the seller terminal 3.

Thereby, it is unnecessary to transmit the purchaser data 18 and the seller data 19 between the seller terminal 3, the purchaser terminal 4, the intermediate server 1A and the intermediate server 1B every time, resulting in less amount of transmission data.

As described above, in the transaction management method, apparatus and program according to this invention, the transmission and reception of data between the seller terminal and the purchaser terminal is made in accordance with the transaction procedure determined by the transaction type and its attribute information. Thereby, the transaction procedure in the network service transaction, the service covenant, and the data input in the transaction can be almost unified. Therefore, the user (purchaser) can almost predict the progress of transaction procedure, and rely on the transaction procedure. The seller can also rely on the data transmitted or received to or from the intermediate server without particularly having the check function. Accordingly, both the seller and the purchaser can be engaged in the network service transaction without anxiety.

Also, in the transaction management method, apparatus and program according to this invention, the transaction identification information and the procedure being executed are stored, and if the transaction is interrupted, the transaction can be resumed from the interrupted procedure on the basis of the input identification information. Thereby, even if the transaction is interrupted halfway, the transaction can be continued from the interrupted procedure, but not from the first procedure.

Also, in the transaction management program recording medium according to this invention, the program of the invention can be provided in the computer readable recording medium, whereby the transaction management apparatus for implementing the transaction management method can be realized easily.

What is claimed is:

1. A transaction management method in an intermediate server to intermediate a transaction between a seller terminal and a purchaser terminal which are interconnected via a network, the method comprising:

storing a transaction procedure comprising a plurality of procedures in a predetermined order for each transaction type, and attribute information regarding data to be transmitted or received in each of the plurality of procedures; and transmitting or receiving the data to be transmitted or received between the seller terminal and the purchaser terminal in accordance with the transaction procedure determined by a transaction type and its attribute information in the transaction between the seller terminal and the purchaser terminal;

storing identification information to identify uniquely the transaction;

storing which procedure the transmission or reception is in accordance with corresponding to the identification information in the transaction between the seller terminal and the purchaser terminal, every time the data to be transmitted or received is transmitted or received between the seller terminal and the purchaser terminal;

receiving the identification information to identify uniquely the transaction from either the seller terminal or the purchaser terminal if the transaction is interrupted in any of the plurality of procedures; and resuming the transaction from the interrupted procedure on the basis of the stored identification information and the received identification information.

2. A transaction management method according to claim 1, further comprising:

storing an item to confirm a format of the data to be transmitted or received in each or any of the plurality of procedures; and confirming the consistency of the format for the procedures to be transmitted or received between the seller terminal and the purchaser terminal in each or any of the plurality of procedures.

3. A transaction management method according to claim 1, further comprising:

storing an item to confirm the consistency between data transmitted from the seller terminal and data transmitted from the purchaser terminal in each or any of the plurality of procedures; and confirming the consistency of the item in the data to be transmitted or received between the seller terminal and the purchaser terminal in each or any of the plurality of procedures.

4. A transaction management method according to claim 1, further comprising:

displaying a mark to identify the transaction on one or both of the seller terminal and the purchaser terminal while transmitting or receiving the data to be transmitted or received between the seller terminal and the purchaser terminal or between the seller terminal or the purchaser terminal and the intermediate server.

5. A transaction management method according to claim 1, wherein the transmission or reception of data between the seller terminal and the purchaser terminal is made via the intermediate server.

6. A transaction management method according to claim 1, wherein the transmission or reception of data between the seller terminal and the purchaser terminal is made directly, wherein communication to confirm the transmission data is made between one of the seller terminal and the purchaser terminal which is the transmission side of the data and the intermediate server before transmission, and wherein communication to confirm the received data is made between the other of the seller terminal and the purchaser terminal which is the receiving side of the data and the intermediate server after reception.

7. A transaction management apparatus to intermediate a transaction between a seller terminal and a purchaser terminal which are interconnected via a network, the apparatus comprising:

first storage means for storing a transaction procedure comprising a plurality of procedures in a predetermined order for each transaction type and attribute information regarding the data to be transmitted or received in each of the plurality of procedures;

procedure management means for transmitting or receiving data to be transmitted or received between the seller terminal and the purchaser terminal in accordance with the transaction procedure determined by a transaction type and its attribute information in the transaction between the seller terminal and the purchaser terminal;

second storage means for storing identification information to identify uniquely the transaction;

third storage means for storing which procedure the transmission or reception is in accordance with corresponding to the identification information in the transaction between the seller terminal and the purchaser terminal, every time the data to be transmitted or received is transmitted or received between the seller terminal and the purchaser terminal;

receive means for receiving the identification information to identify uniquely the transaction from either the seller terminal or the purchaser terminal if the transaction is interrupted in any of the plurality of procedures; and resume means for resuming the transaction from the interrupted procedure on the basis of the stored identification information and the received identification information.

8. A computer readable program recording medium recording a program to realize a transaction management apparatus to intermediate a transaction between a seller terminal and a purchaser terminal which are interconnected via a network, wherein the program causes a computer which is the transaction management apparatus to execute:

storing a transaction procedure comprising a plurality of procedures in a predetermined order for each transaction type, and attribute information regarding data to be transmitted or received in each of the plurality of procedures; and transmitting or receiving the data to be transmitted or received between the seller terminal and the purchaser terminal in accordance with the transaction procedure determined by a transaction type and its attribute information in the transaction between the seller terminal and the purchaser terminal;

storing identification information to identify uniquely the transaction;

storing which procedure the transmission or reception is in accordance with corresponding to the identification information in the transaction between the seller terminal and the purchaser terminal, every time the data to be transmitted or received is transmitted or received between the seller terminal and the purchaser terminal;

receiving the identification information to identify uniquely the transaction from either the seller terminal or the purchaser terminal if the transaction is interrupted in any of the plurality of procedures; and resuming the transaction from the interrupted procedure on the basis of the stored identification information and the received identification information.

* * * * *